United States Patent [19]

Liebig

[11] Patent Number: 4,613,254
[45] Date of Patent: Sep. 23, 1986

[54] EXPANDING DOWEL WITH SETTING-FORCE INDICATOR

[76] Inventor: Heinrich Liebig, Wormser Strasse 23, D-6102 Pfungstadt, Fed. Rep. of Germany

[21] Appl. No.: 648,151
[22] PCT Filed: Mar. 2, 1984
[86] PCT No.: PCT/EP84/00059
§ 371 Date: Sep. 4, 1984
§ 102(e) Date: Sep. 4, 1984
[87] PCT Pub. No.: WO84/03741
PCT Pub. Date: Sep. 27, 1984

[30] Foreign Application Priority Data

Mar. 19, 1983 [DE] Fed. Rep. of Germany ....... 3310001

[51] Int. Cl.$^4$ .................................... E21D 21/02
[52] U.S. Cl. ................................ 405/259; 411/8; 411/9
[58] Field of Search ............... 405/259, 260, 261; 411/7–14, 24–28, 34

[56] References Cited

U.S. PATENT DOCUMENTS

| | | | |
|---|---|---|---|
| 1,852,297 | 4/1932 | Gelpcke | 411/24 |
| 4,019,420 | 4/1977 | Fischer | 411/49 |
| 4,289,061 | 9/1981 | Emmett | 411/9 |
| 4,312,613 | 1/1982 | Binns | 411/34 |

FOREIGN PATENT DOCUMENTS

| | | | |
|---|---|---|---|
| 2249762 | 4/1974 | Fed. Rep. of Germany | 411/24 |
| 2613192 | 10/1977 | Fed. Rep. of Germany | 411/8 |
| 3022011 | 12/1981 | Fed. Rep. of Germany | |
| 1453435 | 10/1976 | United Kingdom | 411/52 |
| 2016106 | 9/1979 | United Kingdom | 411/24 |

Primary Examiner—Dennis L. Taylor

[57] ABSTRACT

An expanding bolt anchor with setting force indication, has a slitted expanding sleeve which can be expanded by at least one expander engaging the bore-internal end. In the bore-internal expander (26) there is held a threaded bolt (30) which is carried in a freely displaceable manner through the expanding sleeve (20), and a spacing sleeve (32) adjoining on the bore-orifice end, the bolt terminating in a bolt head (34) or in a nut threaded thereon, under which a washer (30) is disposed which lies on the upper side of a workpiece (10) to be fastened and through which the spacing sleeve displaceably passes. Between the spacing sleeve (32) and the spreading sleeve (20) there is disposed at least one sleeve-like tube section (36) of soft steel having a pronounced yield point, which bears along its surface a thin carburized layer which is hardened, and whose thickness is such that, when a bolt anchor-specific setting force is applied, compressive forces will prevail in this tube section at which the hardened layer breaks up, whereupon the rest of the material is axially compressed with perceptible reduction of the setting force.

18 Claims, 4 Drawing Figures

Fig. 1
Fig. 2
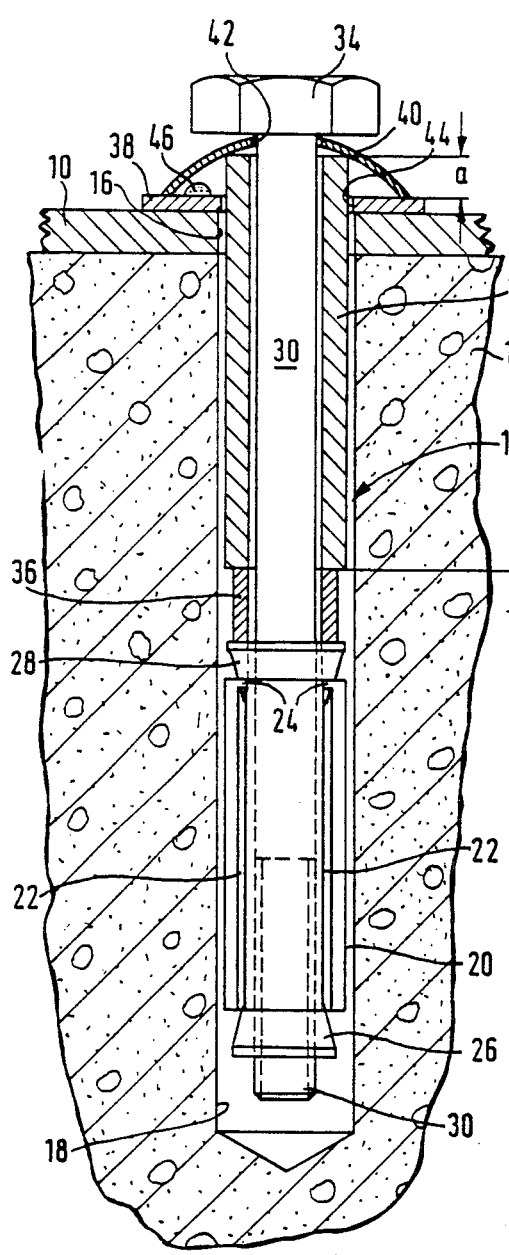
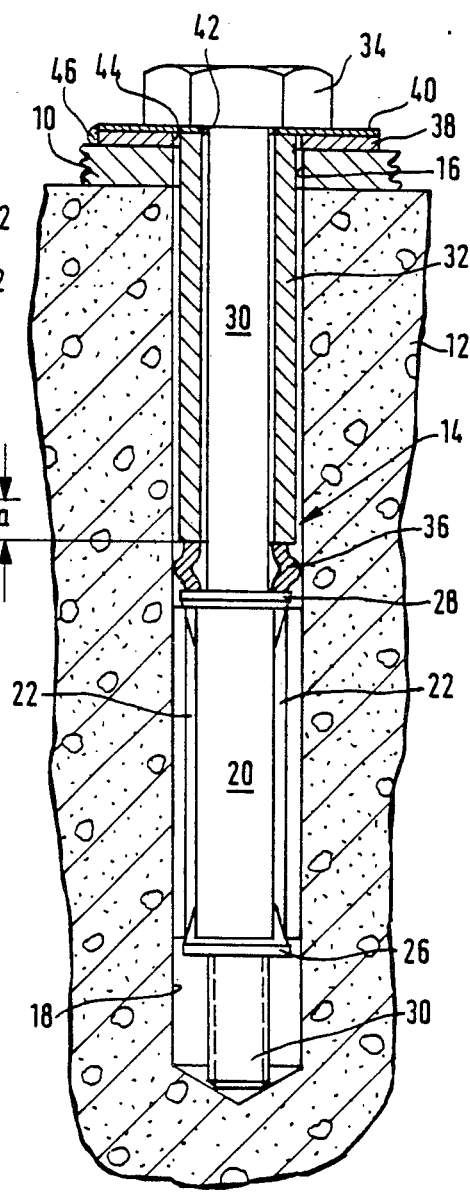

EXPANDING DOWEL WITH SETTING-FORCE INDICATOR

The invention relates to an expanding bolt anchor which can be inserted into a hole in a ground and which has an expanding sleeve divided by longitudinal slits into segments. The sleeve can be expanded by at least one conical expander engaging the bore-internal end of the sleeve, preferably by two conical expanders pointing toward one another with their tapered ends and engaging the opposite ends of the sleeve, by tightening a bolt whose bore-internal end engages the bore-internal expander and which passes in a longitudinally displaceable manner through the expander that may be provided at the bore-orifice end of the sleeve. A nut or bolt head is provided on the bore-external end of the bolt and through a spacer bushing thrusts against the expanding sleeve, or against the expander provided at the bore-orifice end of the sleeve as the case may be. At the bottom of the bolt head or nut facing the ground, a washer is provided which clamps the workpiece against the surface of the ground, and a sleeve-like tube section of a soft steel with a pronounced plastic flow limit (compression yield point) is provided between the bolt head or nut and the expanding sleeve or the expander provided at the bore-orifice end of the sleeve as the case may be. The wall thickness of the tube section is so dimensioned that, upon the application of a setting force specific for the bolt anchor, compression stresses will prevail in this tube section which just equal the stresses prevailing in the material of the tube section when the plastic flow limit (compression yield point) is reached.

When workpieces are to be fastened to a ground by means of anchors, the maximum holding power that can be achieved by each anchor, and thus also the maximum strength and life of the fastening, is generally reached when the setting force characteristic for a particular anchor is maintained in the bolt, i.e., the tension force or forces are maintained in the bolt, which are allowable for the particular stress involved and the cross-sectional area of the bolt. It is important, however, for a slippage-free setting of the expanding sleeve, that, in the setting process, a maximum allowable setting force specific for the anchor is introduced into the anchor, which on the other hand may not be exceeded if the bolt is not to be overstrained. Since the force or tensions prevailing in the bolt are not directly measurable, the anchor manufacturers prescribe the tightening torques to be applied to the nut threaded on the bolt or to the bolt head, as the case may be, which are calculated on the basis of the tension allowable in the cross section of the particular bolt in consideration of the strength of its material, and which can easily be established by means of torque wrenches. In practice, however, the calculated (and prescribed) torque does not correspond to the setting force that is allowable in view of the load that can be applied to the bolt. As a result of friction occurring between the anchor components during the setting process, only a portion of the applied torque is converted to tension in the bolt. If the friction loss in anchors of the same constructional design were in any way equal, allowance could be made for it simply by means of correspondingly higher prescribed torques, i.e., a tightening efficiency could be introduced. Unfortunately, however, the setting force achieved in similar anchors by the same tightening force varies so greatly that they cannot be correctly determined by mathematical correction of the torque. Therefore an anchor has already been developed (DE-OS No. 30 22 011) in which the attainment of the prescribed setting force, regardless of the different friction resistances occurring when the anchor is tightened, is indicated by a spherically cupped washer. If its material is properly selected and if it is properly dimensioned, this washer will have a resistance to deformation such that, when it is axially deformed from the original cupped shape to a flattened disk, it will correspond precisely to the magnitude of the setting force prescribed for the anchor in question, i.e., an anchor equipped with this washer is set with the prescribed tightening force when the washer is deformed from its domed shape into flush and flat engagement with the workpiece or ground. The setting force indication given by such a deformable washer has not been fully satisfactory, because on the one hand the slight differences of deformation of the washer just before reaching the completely planar shape are very difficult to perceive with certainty, so that it is not entirely impossible that the nut or bolt head of the anchor may be tightened with too little force, or—what is more dangerous still—with too great a force.

On the other hand, in an anchor in accordance with an older, unpublished proposal of the inventor, the axial deformability of a sleeve-like tube section of (soft) steel having a pronounced flow limit, whose wall thickness is such that, when the setting force specific for the dowel is applied, compressive stresses prevail which are equal to the stresses prevailing when the yield point is reached in the material of the tube section. The sleeve-like tube section therefore begins, when the prescribed setting force is reached, to deform quite visibly axially, without any further increase occurring in the material stress. To make the axial tightening movement available and to be able also to observe the deformation of the tube section, the anchor must be set such that a sufficient clearance will exist between the surface of the workpiece and the underside of the anchor bolt head or nut facing the latter. In the case of the expanding anchor in accordance with the older proposal, this is achieved by means of an easily deformable follower element held on the anchor itself, but this can be dispensed with if the necessary spacing is established, when the anchor is set, by means of an interposed spacing gauge which is removed after the anchor is given an initial tightening.

It is the object of the invention to improve the bolt anchor of the older proposal such that the deformation of the tube section occurring when the prescribed setting force is reached can be triggered more precisely and can be clearly perceived by the installing personnel.

Setting out from a bolt anchor of the kind described above, this object is achieved in accordance with the invention in that the tube section is shallowly casehardened in the area which deforms in the axial direction when the setting force specific for the anchor is reached. The casehardened layer increases the compressive strength of the axially deformable tube section, so that its deformation cross section can be diminished. When the prescribed setting force is reached, the shallow casehardened layer snaps apart and then is unable to contribute to the transfer of pressure in the axial direction. The remaining, unhardened, soft material can then be deformed plastically by a considerably lesser force, i.e., after the hardened layer breaks up, the axial force necessary for the setting of the anchor greatly diminishes, and at this reduced axial force a relatively strong axial compression is possible, so that the reaching of the prescribed setting force of the anchor becomes recognizable by the lesser amount of tightening force required.

The tube section is preferably made of steel of low carbon content, and before it is hardened carbon is diffused into the areas that are to be hardened, according to the thickness to be achieved in the hardened layer. Since the carbon necessary for such casehardening is then present only in the thin surface layer, accidental hardening all the way through the tube section is not possible.

In an advantageous further development of the invention, the tube section is formed by at least one, preferably two or more circumferential constrictions set apart from one another axially in a sleeve section disposed separately between the spacing sleeve and the expanding sleeve or bore-orifice-end expander, as the case may be, the sleeve section being best casehardened on its entire inside and outside.

Alternatively, the tube section can be formed by at least one, preferably two or more circumferential constrictions axially separated from one another in the spacing sleeve itself, the latter being then likewise casehardened on its inside and outside surface.

To assure the necessary deformation movement of the tube section, it is recommendable, as in the case of the anchor formerly proposed, to dispose between the bottom of the bolt head or nut and the workpiece to be fastened a compressible follower element which, when the setting force specific for the anchor is reached, will be compressible axially, by the amount of the axial upsetting of the tube section, under the effect of a relatively slight force acting in the axial direction.

The invention is further explained in the following description of an embodiment in conjunction with the drawing, wherein:

FIGS. 1 and 2 are cross sectional views through a bolt anchoring arrangement produced with a bolt anchor made in the manner of the invention, in which a workpiece is fastened to a ground with a double-expanding anchor represented partially in cross section, FIG. 1 showing the anchor in the loosely installed state and FIG. 2 representing the anchor fully set.

Figures 3, 4:
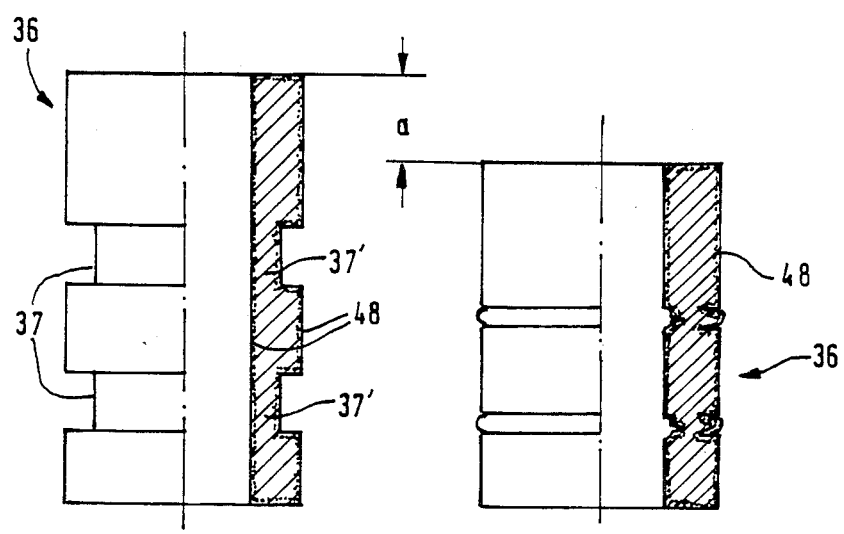
FIGS. 3 and 4 are side views, half in cross section, of the axially deformable sleeve section which is provided in the anchor of FIGS. 1 and 2, representing it in the undeformed initial state in FIG. 3 and, in FIG. 4, in the tightened and deformed state after the anchor has been set with the prescribed setting force.

The embodiment shown in FIGS. 1 and 2 illustrates an arrangement for the fastening of a workpiece 10 to a ground 12, which can be, for example, a concrete floor. The fastening is performed in this case by means of a socalled double-expanding anchor 14, which is inserted through the fastening hole 16 in the workpiece 10 into a hole 18 drilled in the ground 12. The anchor 14 has, as the anchoring component, an expanding sleeve 20 which is divided from the bore-internal end by longitudinal slits 22 into individual leaf-like segments. The slits 22 are not carried all the way to the upper end of the expanding sleeve, so that the sleeve is thus held together at the upper end by the remaining portions 24 which serve as breakaways to break open during the setting of the anchor.

Into the ends of the expanding sleeve 20 there are inserted the tapered ends of conical expanders 26 and 28, while a threaded bolt 30 passing through the entire length of the anchor is screwed into a tap provided in the bore-internal expander 26. In the other expander 28 there is provided a smooth through-bore through which the bolt 30 passes with clearance. On the section of bolt 30 situated above the last-mentioned expander 28 there is placed a spacing sleeve 32 which transfers the tightening force of a bolt head 32 formed by upsetting on the external end of the bolt 30, while between the face at the bottom end of the spacing sleeve 32 and the face of the expander 28 pointing toward the bore orifice there is also provided a sleeve section 36 of soft steel, i.e., a steel having a pronounced yield point, which—as it will be further explained below in conjunction with FIGS. 3 and 4—is casehardened to a shallow depth. The sleeve section 36, whose diameter and wall thickness are dimensioned in accordance with the spacing sleeve, has two axially separated, circumferential constrictions 37 (FIG. 3) whose depth in each case is such that, in the remaining material cross section 37', when the bolt 30 is tightened with the setting force prescribed by the manufacturer for the anchor 14, the axial force acting on it produces compressive stresses which are so high that the sleeve section collapses axially in the area of the constrictions 37. The tube section 36 thus deforms plastically in the area of the constrictions with axial shortening, to the shape diagrammatically indicated in FIG. 2, without the need to increase the tightening force beyond the allowable setting force, if the material cross section 37' in the area of the constriction 37, allowing for the strength increase due to the casehardened layer, is such that the casehardened layer breaks up and the material cross section is then stressed beyond the yield point (compression yield point) specific for the material. This predeterminable axial compression a which is produced just as the setting force is reached while the anchor is being tightened is relatively great, depending on the axial length of the constrictions 37, but it can be observed only when the bore-orifice end of the spacing sleeve 32 projects by this amount a above the upper side of the workpiece 10 or above a planar washer 38 resting on the workpiece. In order positively to make this projection of the spacing sleeve 32 corresponding to the axial compression a available when the anchor is set, a follower element 40 which is axially deformable by relatively weak forces is disposed between the bottom of the bolt head 34 and the bore-orifice end of the spacing sleeve 32. This follower element is, in the embodiment represented, in the form of a spherical cup stamped from thin sheet metal and having a central opening 42 to accommodate the bolt 30; its concave cavity faces the workpiece 10 or planar washer 38, and its axial depth is such that the spacing sleeve 32, when the free edge of the follower element 40 lies on the workpiece or washer, extends into this cavity by the amount a, as shown in FIG. 1. The follower element, however, can also be omitted if a forked spacing gauge of thickness a is inserted between the bottom of the bolt head 34 and the washer 38 when the anchor is being set. This makes it possible to set the anchor with spacing sleeve 32 projecting by the amount a, and the gauge can easily be withdrawn after the anchor has been lightly tightened.

When the anchor, which is at first loosely installed in the manner shown in FIG. 1, is tightened, first the bore-internal expander 26 is drawn into the associated end of the expanding sleeve 20, so that the latter expands and engages the circumferential wall of the bore 18. The expanding sleeve is thus fixed axially in the hole 18, and upon further tightening the bolt 30 screws itself positively into the bore, while the bottom of the bolt head, while deforming the follower element 40, drives the spacing sleeve 32 into the interior of the hole. This thrust is transferred by the sleeve section 36 to the expander 28 which breaks one or more of the portions 24 of the expander 20 and then also expands the bore-orifice end of the expanding sleeve, causing the latter to fully engage the wall of the bore in the manner represented in FIG. 2. Upon further turning of the bolt 30, the tightening force then rapidly increases until it is of such a magnitude that the compressive stresses in the material cross sections 37' remaining in the area of the constrictions 37 exceed the level of the yield points characteristic of the material of the sleeve section 36, after the casehardened layer breaks up. Then the tube section 36 shortens in the manner already described, while the bolt can be tightened by markedly reduced force until the follower element 40 is flattened against the washer 38. As a result of the presumed dimensions of the constrictions 37, the maximum tightening force at which the material cross sections 37' begin to deform is, however, just equal to the prescribed setting force. That is to say, when the bolt head 34 is tightened to the point at which the follower element 40 flatly engages the washer 38, the anchor is properly set, i.e., its prescribed setting force is reached at least once before it has been partially diminished again upon the axial deformation of the sleeve section 36 in the area of the constrictions 37. The same effect is, of course, also achieved if the bolt 30 is a fully threaded dowel on which a nut is threaded instead of the upset bolt head 34. Since the spacing sleeve shifts when the anchor is put through the central bore 44 of the washer 38, the diameter of the hole 44 in the washer must therefore be slightly larger than the outside diameter of the spacing sleeve 32. Thus, a washer loosely placed on the anchor might fall off the anchor and be lost. For this reason the edge of the follower element 40 resting on the upper surface of the washer 38 is cemented or otherwise joined to the washer 38, so that it is attached to the anchor by the follower element held between the spacing sleeve 32 and the bolt head 34 such that it will not be lost. If the cemented joint breaks during the setting process, this will do no harm, because then the loss of the washer is no longer possible.

In FIG. 1, a breakable capsule filled with a colored fluid composition 46 is disposed in the cavity formed between the top of the washer and the inner surface of the cup-shaped follower element. When the anchor is set, the capsule is broken open by the flattening follower element 40, and fluid composition is displaced, and by emerging from the circumferential seam between the washer 38 and the follower element 40 additionally indicates that the follower element 40 has assumed the planar shape, i.e., the prescribed setting force has been attained.

In FIGS. 3 and 4 the sleeve section 36 with the constrictions 37 is shown before and after the setting of the anchor, the thin surface layer 48 carburized by diffusion with carbon and then casehardened being indicated in the right half, shown in section, of the sleeve section 36. It can be seen that the casehardening 48 is provided on all sides of the sleeve section, i.e., on the outer surface provided with the constrictions 37 and the inside cylindrical surface, as well as the end faces. The establishment of two (or more) constrictions 37 in the sleeve section 36 instead of a single, correspondingly longer constriction, or the use of a tube section of the proper length but reduced wall thickness—which basically would also be possible—is for the purpose of preventing unequal deformations of the sleeve section resulting in possible malfunctioning.

It is evident that variations and further developments of the above-described embodiment can be made within the scope of the invention. For example, the determination of the setting force by a sleeve section of appropriate dimensions can be achieved even in single anchors or anchors which expand conically from the bore-internal end, in which case the sleeve section, if it is made separately, is best disposed between the bore-internal end of the spacing sleeve and expanding sleeve, or the spacing sleeve itself is provided with the setting force-indicating constriction or constrictions by turning down the material in a lathe. In these cases it is best to caseharden the entire spacing sleeve in the manner described.

I claim:

1. An expanding bolt anchor to be inserted into a bore, in a ground, comprising: an expanding sleeve divided by longitudinal slits into segments, at least one conical expander, said at least one expander engaging a bore-internal end of the expanding sleeve for expanding the same, a bolt having a bore-internal end engaging the expander and a bore-external end, tighening means on said bore-external end of said bolt, a spacer bushing extending around said bolt and engaging the expanding sleeve, a washer beneath said tightening means for clamping a workpiece against the surface of the ground, and a sleeve-like tube section of a soft steel with a pronounced plastic flow limit, arranged between said tightening means and said expanding sleeve, the tube section having a wall thickness such that, upon application of setting force specific for the bolt anchor, compression stresses will prevail in the tube section which just equal the stresses prevailing in the material of the tube section when the plastic flow limit is reached, the tube section having a hardened thin surface layer in the area which deforms axially when the anchor-specific setting force is attained.

2. A bolt anchor according to claim 1, wherein said tube section consists of steel of low carbon content, prior to hardening sufficient carbon being diffused in the surface areas to be hardened, for obtaining the hardened layer.

3. A bolt anchor according to claim 1, wherein the tube section is formed by at least one circumferential constriction in a sleeve section disposed separately between the spacer bushing and the expanding sleeve.

4. A bolt anchor according to claim 2, comprising at least two circumferential constrictions, separated from each other in axial direction.

5. A bolt anchor according to claim 3 or 4, wherein the sleeve section is casehardened on its outer and inner surface.

6. A bolt anchor according to claim 1, wherein the tube section is formed by at least one circumferential constriction in the spacer bushing itself.

7. A bolt anchor according to claim 6, comprising at least two circumferential constrictions, separated from each other in axial direction.

8. A bolt anchor according to claim 6 or 7, wherein the spacer bushing is casehardened on its outer and inner surface.

9. A bolt anchor according to claim 1, wherein a follower element is disposed between said tightening means and the workpiece, said follower element being compressible in axial direction upon application of a relatively low force acting in axial direction, by the amount of the axial compression of the tube section when the anchor-specific setting force is attained.

10. An expanding bolt anchor to be inserted into a bore in a ground, comprising: an expanding sleeve divided by longitudinal slits into segments, two conical expanders pointing toward one another and having tapered ends respectively engaging opposite ends of said sleeve for expanding the same, a bolt having a bore-internal end engaging the bore-internal expander and passing in a longitudinally displaceable manner through the expander at the bore-orifice end of the sleeve, tightening means on a bore-external end of said bolt, a spacer bushing around said bolt and engaging the expander at the bore-orifice end of the sleeve, a washer beneath said tightening means for clamping a workpiece against the surface of the ground, and a sleeve-like tube section of a soft steel with a pronounced plastic flow limit, arranged between said tightening means and said expander at the bore-orifice end of the sleeve, the tube section having a wall thickness such that, upon application of a setting force specific for the bolt anchor, compression stresses will prevail in said tube section which just equal the stresses prevailing in the material of the tube section when the plastic flow limit is reached, the tube section having a hardened thin surface layer in the area which deforms axially when the anchor-specifc setting force is attained.

11. A bolt anchor according to claim 10, wherein said tube section consists of steel of low carbon content, prior to hardening sufficient carbon being diffused in the surface areas to be hardened, for obtaining the hardened layer.

12. A bolt anchor according to claim 10, wherein the tube section is formed by at least one circumferential constriction in a sleeve section disposed separately between the spacer bushing and the expander at the bore-orifice end.

13. A bolt anchor according to claim 12, comprising at least two circumferential constrictions, separated from each other in axial direction.

14. A bolt anchor according to claim 12 or 13, wherein the sleeve section is casehardened on its outer and inner surface.

15. A bolt anchor according to claim 10, wherein the tube section is formed by at least one circumferential constriction in the spacer bushing itself.

16. A bolt anchor according to claim 15, comprising at least two circumferential constrictions, separated from each other in axial direction.

17. A bolt anchor according to claim 15 or 16, wherein the spacer bushing is casehardened on its outer and inner surface.

18. A bolt anchor according to claim 10, wherein a follower element is disposed between said tightening means and the workpiece, said follower element being compressible in axial direction upon application of a relatively low force acting in axial direction, by the amount of the axial compression of the tube section when the anchor-specific setting force is attained.

* * * * *